H. AND E. MATTSON.
COMBINATION HAY AND MANURE HOOK.
APPLICATION FILED APR. 7, 1919.
1,312,703. Patented Aug. 12, 1919.
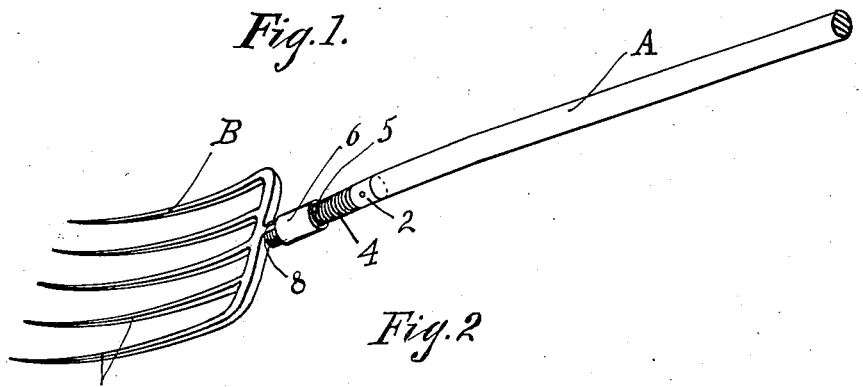
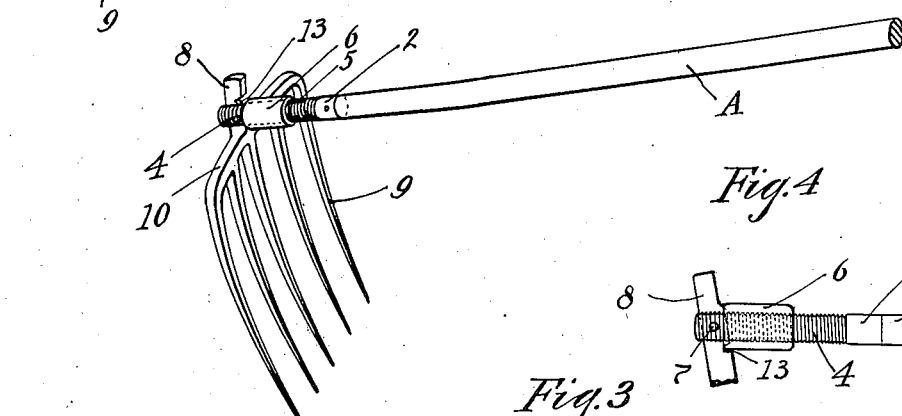
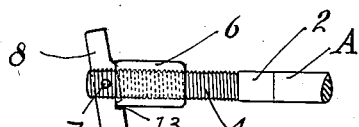
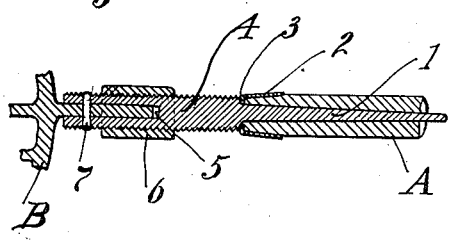
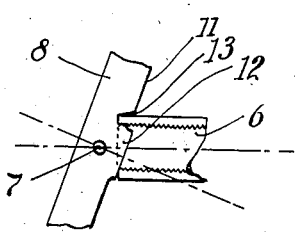
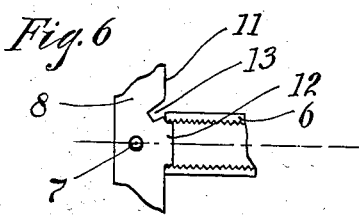
Inventors,
Henry Mattson
Edward Mattson
by
their Attorney

UNITED STATES PATENT OFFICE.

HENRY MATTSON AND EDWARD MATTSON, OF HUTCHINSON, MINNESOTA.

COMBINATION HAY AND MANURE HOOK.

1,312,703.      Specification of Letters Patent.      Patented Aug. 12, 1919.

Application filed April 7, 1919. Serial No. 288,099.

*To all whom it may concern:*

Be it known that we, HENRY MATTSON and EDWARD MATTSON, citizens of the United States, residing at Hutchinson, in the county of McLeod and State of Minnesota, have invented certain new and useful Improvements in Combination Hay and Manure Hook, of which the following is a specification.

This invention relates to forks for pitching hay and the like and to potato and manure hooks, but more particularly to devices of the class described, so constructed as to be readily convertible from one to the other.

The object of the invention is to provide in a fork, improved means whereby the tined member may be set to assume varying positions relative to the handle.

To this end the invention consists in the construction, combination and arrangement of parts hereinafter described and claimed.

Referring to the drawings:—

Figure 1, is a perspective view of the invention adjusted to form a hay fork.

Fig. 2, is a perspective view of the invention adjusted to form a manure or potato hook.

Fig. 3, is a fragmentary longitudinal sectional view of the adjusting means between the handle and the tined member.

Fig. 4 is a side view of same, and

Figs. 5 and 6 show somewhat diagrammatically, the two angular positions to which the tined member may be adjusted.

As shown in the drawings A represents a handle and B a tined member of a hay fork.

In Fig. 3 is shown one way of joining the handle with our improved adjustable connecting mechanism, and comprises a tapered spike end 1, firmly inserted in the end of the handle, the latter reinforced with a ferrule 2, abutting against a shoulder 3 formed at the juncture of the spike end with the shank 4. The shank is cylindrical and formed with a comparatively deep bifurcation 5, and is of uniform diameter and screw-threaded throughout its length. A threaded sleeve 6 fits the thread on the shank and may be moved to travel thereon, so as to cover the major portion of the bifurcation 5. Movably fitted in the bifurcation, and pivoting on the pin 7 secured in the shank is the elongated lug 8, of suitable width to freely enter the interior of the sleeve 6 and to be immovably held thereby when the latter is positioned to cover the bifurcation and the lug therein. Thus when the sleeve is moved to uncover the lug, the latter may be freely moved about the pivot 7. The lug forms an integral part of the tined fork member B, the tines 9 extending in a general direction opposed to that of the lug, the lug and tines integrally joined to a cross member 10.

As indicated in Fig. 1, the fork member and handle extend approximately in the same plane to form a hay fork.

In Fig. 2, the fork member is shown turned at right angles to the handle, the sleeve 6 brought, by means of the screw thread, firmly against the lug to rigidly hold the fork member in position.

In Figs. 5 and 6, it will be noted that the lug is formed along its edge 11 at a point opposite pivot 7, with a raised portion 12, adapted to fit into the end of the sleeve, the shoulder formed by said raised portion together with the edge 11, coöperating to firmly hold the fork member positioned when the sleeve 6 is screwed in place. It is often desirable, especially when used as a manure hook, to have the fork member at a somewhat greater angle with respect to the handle than 90, the tines frequently becoming bent outwardly when projected into solidly packed material. To permit the fork member to be held at a greater angle, a notch 13 in the edge 11 is provided, the edge of the sleeve resting against the bottom of the notch and abutting against the raised portion 12, thereby holding the fork member at an angle indicated by the dotted lines in Fig. 5.

We claim:

1. In combination, a bifurcated handle, a fork member formed with an outwarlly extending lug extending loosely through and beyond said bifurcation, a pivot pin piercing said lug and handle, a notch in the edge of said lug above the handle and facing the latter and a sleeve screw threaded on the handle adapted to be screwed into and against the bottom of said notch and against said lug for the purpose set forth.

2. In combination, a bifurcated handle, a fork member formed with an outwardly extending lug extending loosely through and beyond said bifurcation, a pivot pin piercing said lug and handle, screw threads on the handle, a sleeve fitting said threads and adapted to be moved to telescope over the outer end of said lug to hold the fork member in one position relative to the handle, and a lateral extension on said lug in alinement with said pivot and fitting into the interior of said sleeve to hold said fork member in another position relative to the handle.

In testimony whereof we affix our signatures in presence of two witnesses.

HENRY MATTSON.
EDWARD MATTSON.

Witnesses:
C. F. FIRMAN,
H. E. MERGEN.